United States Patent
Powell et al.

(10) Patent No.: US 6,309,588 B1
(45) Date of Patent: Oct. 30, 2001

(54) PROCESS AND APPARATUS FOR BENDING THIN-WALL PLASTIC TUBING

(75) Inventors: Patrick Powell, Lapeer; Russell Manning, Pontiac, both of MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/326,371

(22) Filed: Jun. 4, 1999

(51) Int. Cl.[7] .............. B21D 9/00; B21D 37/16; B29C 53/08; B29C 53/84

(52) U.S. Cl. .............. 264/570; 72/201; 72/202; 72/342.6; 72/342.94; 72/369; 264/322; 264/339; 425/363; 425/392

(58) Field of Search ............... 264/322, 339, 264/570, 572; 425/363, 392; 72/201, 202, 342.6, 342.94, 369

(56) References Cited

U.S. PATENT DOCUMENTS 4,097,573 * 6/1978 Parmann ................. 264/322

FOREIGN PATENT DOCUMENTS 58-51112 * 3/1983 (JP) ..................... 264/570

* cited by examiner

*Primary Examiner*—Leo B. Tentoni
(74) *Attorney, Agent, or Firm*—Reising, Ethington, Barnes, Kisselle, Learman & McCulloch, P.C.

(57) ABSTRACT

Process and apparatus for bending thin-wall thermoplastic tubing utilizing pressure inside the tube portion being bent to thereby maintain the shape of the tube during bending, and applying heat only in the zone of the tube that is stretched by pulling it axially during continuous incremental bending around a rotatable bend die to thereby maintain the original cross-sectional shape of the tubing. The tube inside radius surface is continuously supported during application of bending-induced tensile stress by causing the tube to track or wrap partially around a rotatable bend die in a generally linear (minimum slip) tracking mode.

42 Claims, 4 Drawing Sheets

PROCESS AND APPARATUS FOR BENDING THIN-WALL PLASTIC TUBING

FIELD OF THE INVENTION

This invention relates to bend forming of tubular members, and more particularly refers to processes and apparatus for bending thin-wall plastic tubing for use in automotive fluid conduit systems.

BACKGROUND OF THE INVENTION

In order to use thin wall, monowall, or multiple layer wall plastic tubing (i.e., wherein the ratio of OD: total or cumulative Wall Thickness>4:1) in an automobile fluid handling system, it generally becomes necessary to bend and shape such tubing to fit the application. Such tubing may be of monowall thermoplastic construction, or multiple (e.g., two through seven) layer tubing wherein all layers are of thermoplastic material or wherein some layers are of metallic material and the remainder of plastic material. As with any thermoplastic tube, the addition of heat is necessary to not only allow the tube to bend to the required shape but also to set the tube in this shape so that it remains in the bent shape after the bending is completed. This bend forming process has proved to be a difficult task because of the nature of the plastic tube to kink or deform at the bend, which at the minimum can cause unwanted turbulence of liquid passing through the tube. Such deformations also cause weaknesses in the tube which would not be acceptable for the end use from a performance standpoint.

Bend forming the tube only in the required areas requires a knowledge of how the bending stress is distributed in a tube as it is being bent. This stress can be simplified for this explanation to be shown as axial stresses acting along a given zone of the walls of the tube in either a compressive or tensile state. Tensile stresses acting in the walls of the tube stretch the tube so as to lengthen it, and compressive stresses compress the walls of the tube so as to shorten it. Most of the deformation problems associated with bending the tube occur because of the compressive stresses that occur on the inside of the bend radius. As the tube is bent around a bending die, material in the tube must flow either in a compressive or tensile state to conform with the physical bending forces that are being exerted on the tube. This material flow is what allows the tube to eventually conform to the shape of the bending die. The tube bending stresses resolve into compressive stresses acting on the inside radius of the tube during bending that make the material on the inside radius of the bend want to push together. However, this is physically impossible because the material will not naturally form a thicker wall while maintaining the shape of the original tube. It will instead flow in what is referred to as "kinks" or unwanted deformation, actually pushing or folding the tube wall material up and down away from the bend die.

OBJECTS OF THE INVENTION

Accordingly, among the objects of the present invention are to provide a new and improved method or process, and a new and improved apparatus for performing the same, which enables thin wall (both monowall and multiple layer wall) plastic tubing to be bent successfully while preventing the aforementioned unwanted deformations in the tube wall at the bend area of the tube.

Another object is to provide a new and improved method and apparatus of the aforementioned character which is economical to respectively practice and construct, efficient and reliable in operation and adaptable for forming bends in thin wall plastic tubing through a wide range of bend angles.

SUMMARY OF THE INVENTION

In general, and by way of summary description and not by way of limitation the process and apparatus of the invention accomplishes the foregoing as well as other objects by utilizing a combination of (1) pressure inside the tube being bent to maintain the shape of the tube during the bending process and (2) applying heat only in the location of the tube which will be stretched. Combining these two steps allows the tubing to be bend formed to the desired bend radius while maintaining the original cross-sectional shape of the tubing. Hence, to sum up, the invention involves the application of heat only in the tensile stress areas of the tube during bending and the application of pressure to the inside of the tube during the same, in order to yield the aforementioned desired results. Various versions of this process have been developed which will be described in this application.

BRIEF DESCRIPTION OF THE DRAWINGS

Additional objects, features and advantages of the present invention will become apparent from the following detailed description, appended claims and accompanying drawings wherein:

DETAILED DESCRIPTION OF PREFERRED EMBODIMENTS

In general, the process and apparatus of the invention utilizes a combination of (1) pressure inside the tube being bent to maintain the shape of the tube during the bending process, and (2) applying heat only in the location of the tube which will be stretched. Combining these two steps allows the tubing to be bend formed to the desired bend radius while maintaining the original cross-sectional shape of the tubing.

More particularly, this new bending process relies on controlled and localized stretching the thin wall plastic tubing (hereinafter referred to as just "tubing") only in the areas where it needs to be stretched. In addition, by applying fluid pressure to the inside of the tube during bending, the walls of the tube are forced or reinforced to maintain their original shape throughout the bending and forming process.

Thus, in accordance with one feature of the invention in bend forming a plastic tube of this character, compressive stresses are eliminated, and only tensile stresses are utilized to form a bend. Tensile stresses placed on a tube being bent when the material is at an elevated temperature will tend to stretch the tube wall on the outer radius of the bend, uniformly thinning the wall of the tube and gradually decreasing the thinning effect toward the inner-most radius area of the bend curvature. This thinning is controllable, and is so controlled to allow the tube to be bent in such a way that no kinks or unwanted deformations are present.

In accordance with a further feature of the invention, the actual application of this phenomenon to the bending process is effected by heating only the outer radius area of the bend curvature, or only in the zone that is commonly referred to as the "backside" of the bend. Moreover, pursuant to this feature just the right amount of heat is so applied to allow the tube to stretch under tensile stress in the desired backside area while letting the inside radius of the tube track or wrap partially around the bend die in almost a linear tracking mode. That is, very little relative motion is thereby allowed between the tube inside radius zone and the adjacent surface of the bend die during tube bending motion. However, due to the friction level of the die to the tube, some slip of the die on the tube may occur. In any event, by doing this, the tube does not have to displace any material in a compressive manner, therefore preventing the tube from kinking or deforming on the inside radius, while at the same time, limiting the amount of tube stretching only to that needed to achieve this result.

Figure 2:
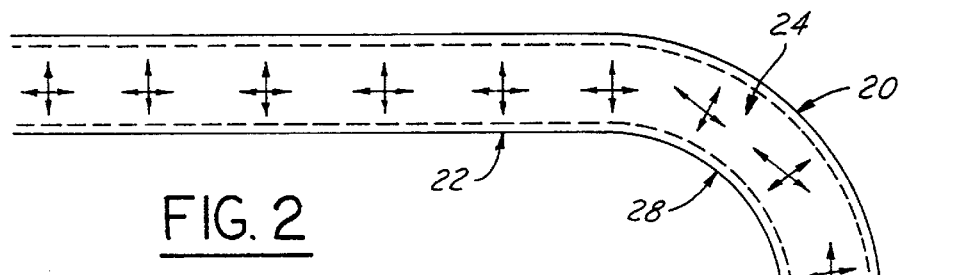
FIG. 2 is a schematic diagram illustrating diagrammatically the reinforcement forces exerted by fluid pressure applied to the inside of the tube during the bending process.
Figure 1:
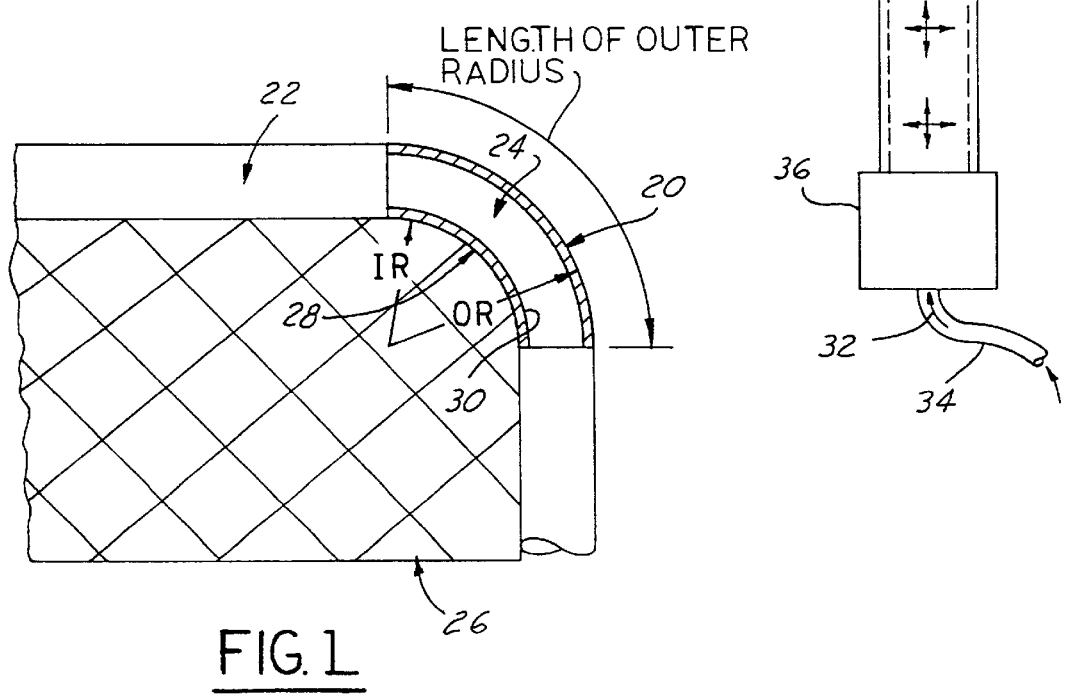
FIG. 1 is a sketch to diagrammatically illustrate certain features of the invention and associated analysis involved in preparation of preliminary steps of performing the process of the invention.

A diagrammatic expression of these features is shown in the sketches of FIGS. 1 and 2 of the appended drawings. As will be seen from FIGS. 1 and 2 a predetermined minimum amount of stretch is imparted to the outer radius zone 20 of a hollow tube 22, in the illustrated example of forming a 90° bend 24 around a stationary bend die 26, so as to insure no adverse compression of the inner radius zone 28 of the bend. Hence, the initial or starting wall thickness of tube 22 is selected accordingly so that the process thinning of the wall thickness in the outer radius zone 20 of the curvature of the tube bend 24 does not reduce the tube wall thickness in zone 20 below that needed for providing a predetermined material hoop or burst strength, for example, that strength of material sufficient to resist, in operation and use for a given application, the maximum bursting hoop stress imparted by the expected maximum fluid pressure forces by fluid contained in the fluid conduit system.

As schematically illustrated in FIG. 2, another major feature in the application of the process or method of the invention is internal reinforcement during bend formation, preferably by the addition of fluid pressure to the inside of tube 22 during the bending process. This fluid pressure acts to push radially outwardly uniformly on the inside wall surface of the tube, and when applied in the correct amount allows tube 22 to maintain its original cross-sectional shape, typically a true circle, while being bent. The fluid pressure forces exerted on the tube inside wall are maintained at a level or value that prevents tube 22 from collapsing inwardly in the tube bend outer radius zone 20. This feature also helps tube 22 wrap-track on the curved working face 30 of die 26 in the tube bend inside radius zone 28. This fluid pressure reinforcement thus must be maintained at a level which is high enough to so aid the bending process but low enough so as not to overcome the burst strength of the tube and thereby blow a hole through the tube wall. These fluid pressure levels may be determined either experimentally or by theoretical analysis. A diagrammatic sketch of this fluid exerted interior pressure is shown in FIG. 2 as schematically illustrated by the arrows therein. Suitable pressurizing fluid 32 may be fed via a feed tube 34 from a suitable conventional supply of pressure fluid (not shown) through a tube connector fitting 36 sealably coupled to the leading end of tube 22. The trailing end of tube 22 (not shown) may be suitably plugged, or alternatively, plumbed in a return path of a fluid supply circuit provided with suitable valving and controls in a conventional manner.

First Embodiment Bending Process and Apparatus

Figure 3:
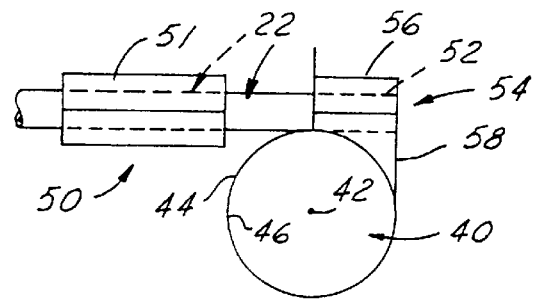
FIGS. 3, 4 and 5 are simplified schematic illustrations of a first embodiment process and apparatus for performing the same, and respectively illustrating three successive steps of this embodiment.
Figure 4:
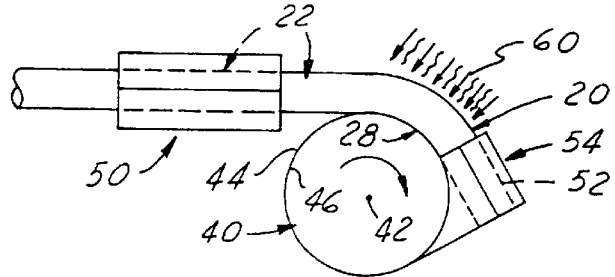
Figure 5:
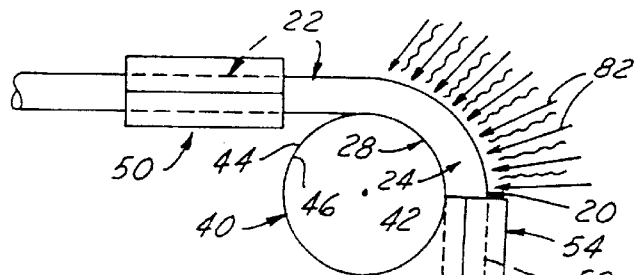
Figure 17:
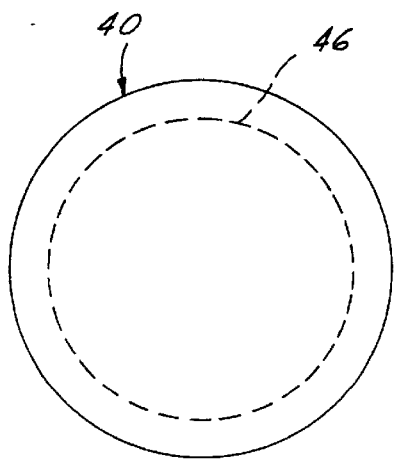
FIGS. 17 and 18 are respectively side and end elevational views of an exemplary bending die form roll, utilizable in the apparatus and methods of FIGS. 3–16.
Figure 18:
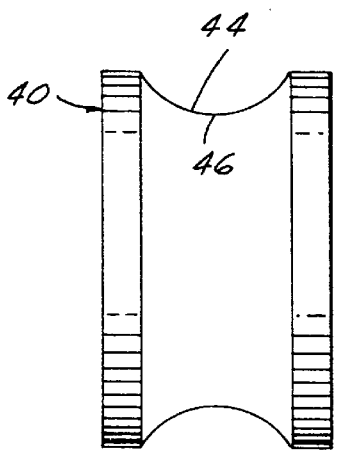

FIGS. 3, 4 and 5 illustrate successive steps employed in a first embodiment bending process and apparatus provided in accordance with the invention. A bending die in the form of a form roll 40 is mounted for clockwise rotation about a stationary axis 42. Such a bending die form roll is shown in FIGS. 17 and 18 and has a concave annular working surface 44 (FIG. 16) appropriately diametrically sized for imparting the desired tube bend curvature.

As shown in FIG. 3 the tube is fed cold (e.g., at ambient room temperature) through a stationarily mounted wiper/guide 50 constructed as an openable lock-up fixture apparatus and located just outside and adjacent the bend die roll 40. Guide 50 is oriented for feeding the tube linear bend-starting-material portion tangentially to the form roll working surface 44. The leading end 52 of this portion of tube 22 is inserted into a split, draw-feeding lock-up fixture apparatus 54 which securely clamps the OD of the tube between an outer, openable part 56 of lock-up fixture 54 and an inner clamp 58 of fixture 54 that is fixed to form roll 40 so as to be carried therewith and rotate bodily about axis 42 as roll 40 likewise rotates about axis 42. It is to be understood that, since the tube 22 is being fed from left to right as viewed in the example of FIGS. 3–5, die form roll 40 will rotate clockwise as viewed in these figures. Of course, if the set-up is reversed to feed tube 22 from right to left as viewed in these figures, roll 40 will rotate counterclockwise as viewed therein.

As bend die form roll 40 rotates clockwise (as shown and viewed by way of example in FIGS. 3–5) from a starting position as viewed in FIG. 3 through its initial 45 degrees of clockwise rotation to reach the position shown in FIG. 4, lock-up draw fixture 54 pulls tube 22 with it, thereby drawing the trailing linear portion of the tube axially and slidably through the wiper/guide lock-up 50 and tangentially into contact with at least the root diameter portion 46 of the working surface 44. As form roll 40 rotates from the FIG. 3 to the FIG. 4 position, the draw lock-up 54 likewise moves with the roll from its FIG. 3 to FIG. 4 position. Since the tube leading end 52 is clamped in draw lock-up 54, the trailing portion of tube 22 is pulled around the outside of the bend die roll generally in a 1:1 linear (minimum slip) wrap-tracking mode to thereby impart the constant radius bend curvature to the first 45 degrees of bend 24.

Note that, as shown in FIG. 4, the portion of the tube exposed in immediately trailing relationship to draw lock-up 54 is heated in the outer radius "backside" zone 20 by application of a suitable heating medium, such as hot air indicated schematically by the arrows 60 in FIG. 4. This applied heat softens tube 22 in the desired location, i.e., outer radius zone 20, and hence the tensile forces being developed by the resolution of the bending forces on the tube are only able to stretch tube 22 in the desired location, namely in the outer radius zone 20 while generating little, if any, compressive forces in the inner radius zone 28. In the meantime, the inner radius zone 28 wraps around die roll 40 with no relative motion therebetween. The tube is thus bent by the co-action of the rotary motion of die roll 40 acting as a moving fulcrum cooperating with bending force applied by lock-up fixture 54 and resisted by the restraint of stationary guide 50.

Once die roll 40 has reached the FIG. 5 position and thus has rotated sufficiently to impart the desired bend radius and angular extent of bend curvature as viewed in FIGS. 3–4 from its starting position in FIG. 3, the bend 24 has been formed and completed in tube 22. The external heating medium 60 is then removed, i.e., application of heat energy to the tube is terminated, and then tube 22 is allowed to cool naturally to reach equilibrium temperature with the surrounding atmosphere. As shown in FIG. 5, as an additional and preferred step, a cooling medium, such as cooling air 82 blown at the outer bend radius 20, can be employed to accelerate the removal of residual heat and hence speed up the overall processing time.

When tube bend 24 has cooled sufficiently to remain stable and retain its as-so-formed bend curvature in a free state condition, the same is removed from the bending apparatus by opening the upper clamp 51 of wiper/guide 50 and opening the upper jaw 56 of draw clamp 54 to enable tube 22 to be removed from this bending apparatus set-up, or alternatively, advanced therein and then reclamped to repeat another bend forming cycle in a further trailing portion of tube 22.

Second Embodiment Bending Procees and Apparatus

FIGS. 6, 7, 8 and 9 illustrate sequentially the steps and apparatus involved in performing a second embodiment of the process of the invention. In FIGS. 6–9, as well subsequently in FIGS. 10–16, like reference numerals are applied to like elements previously described and their description not repeated.

The apparatus employed in the second embodiment is the same as that in the first embodiment except that the wiper/guide lock-up fixture 50 is replaced by a wiper/guide/heater lock-up fixture 70. A lower part 72 of guide 70 is stationarily mounted so that its exit end 74 abuts the entrance end 76 of the lower half part 58 of draw lock-up 54 in its initial starting position shown in FIGS. 7 and 8.

An upper half part 74 of guide 70 is openable and is clamped to part 72 for stationary lock-up with its exit end 78 abutting an entrance end 80 of the openable upper jaw 56 of draw lock-up fixture 54. Upper guide part 74 is made as a heating plate in a conventional manner for controlled application of heat energy by heat transfer to tube 22 only on one side, namely, the side that is to become the "bend backside", (i.e., forming outer radius zone 20) in tube bend 24. The source of heat energy for heat transfer via guidelheating plate 74 may be, for example, electrical resistance heating elements, infrared lamps, microwave tubes, vibration heat generators, hot air, steam, etc.

Figure 6:
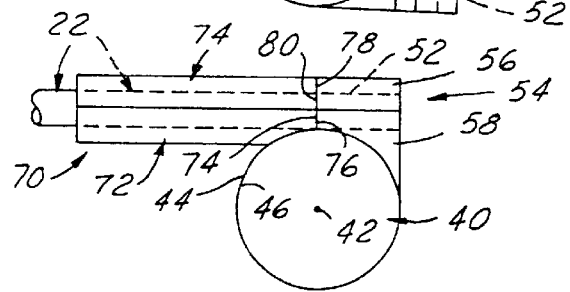
FIGS. 6, 7, 8 and 9 are simplified schematic illustrations of a second embodiment process and apparatus for performing the same, and respectively illustrating four successive steps of this embodiment.
Figure 7:
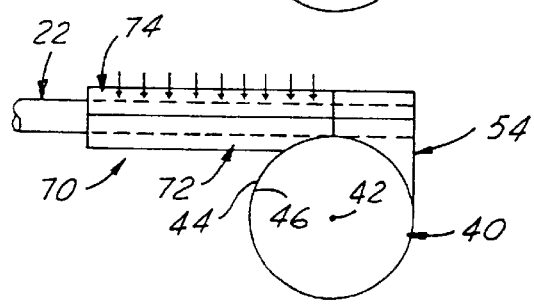
Figure 8:
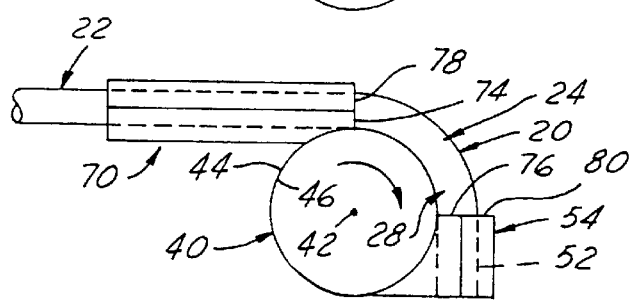

In performing the second embodiment process with the second embodiment apparatus, a forming length of tube 22 is first fixtured in the draw lock-up 54 with its leading end 52 clamped therein and with the associated immediately trailing portion clamped in guide lock-up 70, as shown in FIG. 6. Then, as shown in FIG. 7, heat is applied to tube 22 in the area that is to become the outer radius zone 20 of bend 24. This is effected by heat transfer apparatus 74 to thereby transfer heat to tube 22 only on its upper one half of its circumference, which is that semi-circular cross-sectional portion of tube nested in heater guide/wiper part 74. Once tube 22 has been heated to the proper temperature to allow the proper amount of backside stretch during bending, die roll 40 is activated to rotate the same from its FIG. 7 position to its FIG. 8 position through the desired bend radius and angular extent of bend curvature. This draws the immediately trailing portion of tube 22 over the bend die roll 40 in a linear wrap-track mode, just as in first embodiment process. However, since tube 22 has already been heated prior to bending to the proper temperature in the backside zone that is going to be stretched when tube 22 is die formed into bend curvature 24, no additional heat is required during this bending phase of the operation cycle. As in the step of FIG. 5, once tube 22 has been bent around bend die roll 40 as in FIG. 8, an additional optional step can be performed, namely applying a cooling stream of air, indicated by the arrows 82 in FIG. 9, to the outer radius zone 20 to thereby speed up the cooling process and hence reduce the cycle time.

Third Embodiment Bending Process and Apparatus

FIGS. 10, 11, 12 and 13 illustrate sequentially a third embodiment of the process and apparatus of the invention, which, as will be evident from FIGS. 10–13 as compared to FIGS. 3–9 described hereinabove, is a combination of the first and second process embodiments of the invention. Thus, the third embodiment bending process also applies heat to the tube area that eventually becomes outer radius zone 20 of bend 24. Again this is done employing the heat transfer apparatus 74 which is located in the guide lock-up 70 adjacent the outer radius of bending die roll 40, as in the second embodiment process.

Figure 12:
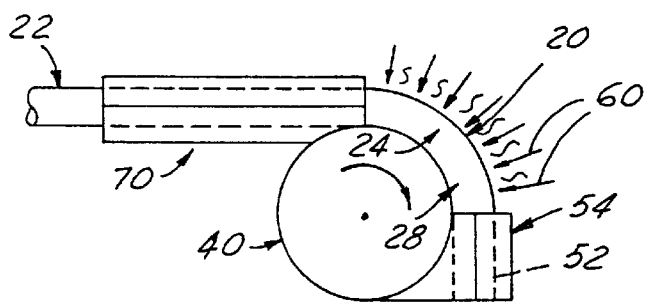

However, in order to make sure that enough heat is applied to the tube to assure the proper bend after completion, the third embodiment process also applies heat, as shown for example in FIG. 12, by application of blowing hot air 60 to the outer radius zone 20 as it is being drawn around bend die roll 40, in the manner of the first embodiment process step illustrated in FIG. 4. Thus, in the third embodiment process and apparatus of the invention tube 22 is heated before, during and immediately after being bent in order to improve the characteristics of the ultimate bend curvature 24 obtained in the process.

Figure 9:
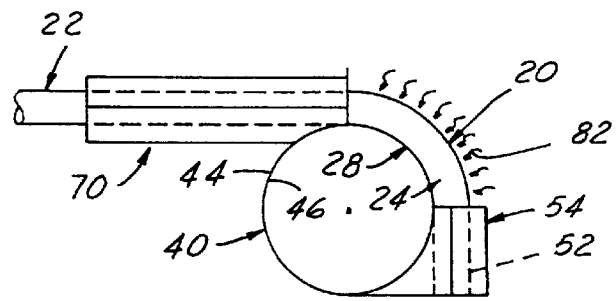
Figure 10:
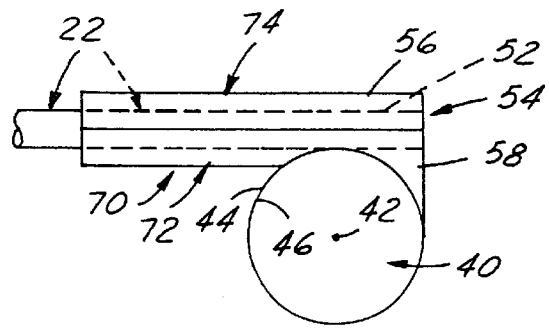
FIGS. 10, 11, 12 and 13 are simplified schematic illustrations of a third embodiment process and apparatus for performing the same, and respectively illustrating four successive steps of this embodiment.
Figure 11:
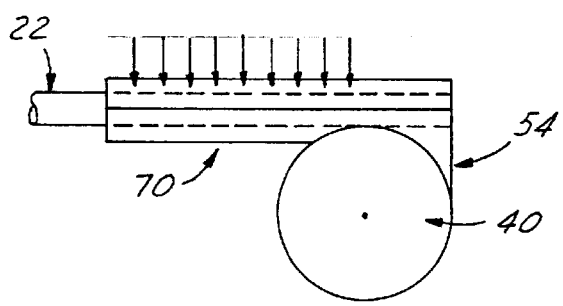
Figure 13:
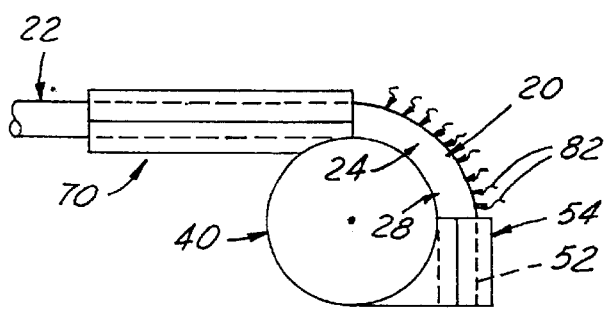

As with the first and second embodiments, a cold stream of air 82 may be applied as shown in FIG. 13, in the manner of FIGS. 5 and 9 of the first and second embodiments, or another method of removing heat from the tube after bending may be employed. This final cooling step thus removes heat more quickly and shortens the bending process overall cycle time which, of course, is desirable from the standpoint of process efficiency.

Fourth Embodiment Bending Process and Apparatus

Figure 14:
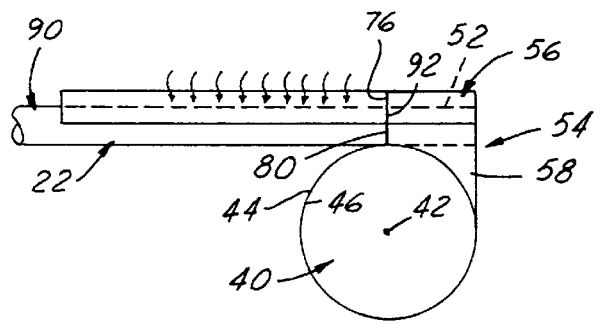
FIGS. 14, 15 and 16 are simplified schematic illustrations of a fourth embodiment process and apparatus for performing the same, and respectively illustrating three successive steps of this embodiment.
Figure 15:
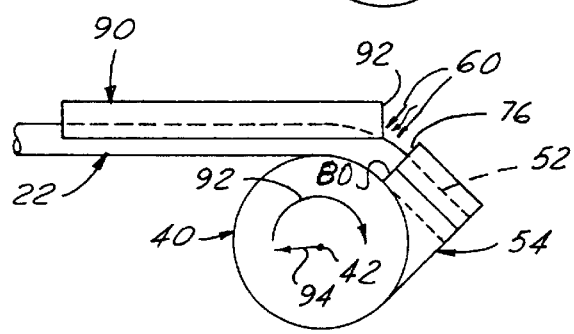
Figure 16:
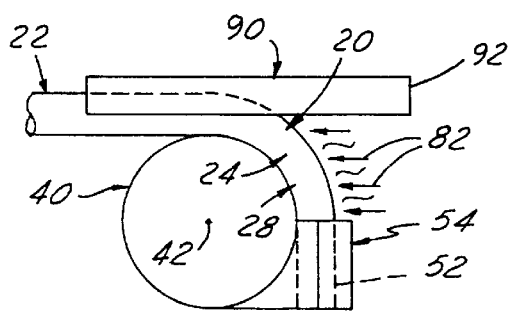

FIGS. 14, 15 and 16 illustrate a fourth embodiment process and apparatus of the invention, that differs from the first three embodiments in that bend die form roll 40, and its associated lock-up draw clamp 54, are conjointly mounted for both rotation of die 40 about axis 42 as well as translation motion of axis 42 to the left as viewed in FIG. 15 and 16. This set-up accommodates pure rolling (little or no sliding) contact of the roll die working surface 44 with the underside of tube 22 so that the same remains axially immobile relative to the heating and guide fixture 90 as it is peeled therefrom. Wiper guide 90 provided in the fourth embodiment apparatus comprises a heater element upper plate similar to upper half clamp of guide plate 74 of the second and third embodiments. However, plate 90 may be mounted stationarily since it is not associated with an underlying lower half clamp 72. The underside of heater element plate 90 is curved to conform with the upper half of the circumference of tube 22, as with heater plate 74, but is made axially somewhat longer to extend farther back along the portion of tube 22 trailing leading end 52. The exit end 92 of heater element 90 is closely adjacent (but does not contact) the entrance end 76 of the upper clamp 56 of draw lock-up 54 in the starting condition of the apparatus as shown in FIG. 14.

It will be seen from FIGS. 14, 15 and 16, as compared to the first, second and third embodiments of FIGS. 3–13, that the fourth embodiment bending process combines elements of the first three processes but differs in the fact that the axis 42 of bend die form roll 40 does not remain stationary but rather moves in a retrograde (i.e., in the reverse direction from the direction of tube feed motion in the prior embodiments) travel path parallel to the axis of tube 22 as roll 40 moves bodily therealong. Hence rotation of roll 40 does not draw tube 22 through guide 90 as the tube wrap-tracks around form roll 40 during the bending process. Instead, the bend die form roll 40 rolls in a generally linear tracking mode along the underside of tube 22 as leading end 52 of the tube is held in the draw lock-up 54, thereby wrapping tube 22 around die form roll 40 without requiring tube 22 to move through or relative to the in-feed guide, namely heater plate 90. This elimination of the need for axial feed motion of tube 22 is desirable to allow multiple bends to be made on the same machine without incorporating additional apparatus to bending elements. This in turn further improves the efficiency of the bending apparatus and allows more tube parts to be made with less labor exerted.

In the performance of the fourth embodiment method and apparatus, tube 22 is loaded into the machine as shown in FIG. 14 with its leading end 52 clamped in fixture 54 and the upper half circumference of the immediately trailing portion of tube 22 nested into the conforming curvature of the receiving surface of heater element 90. Then heater plate 94 is heat energized to transfer heat into the upper surface of the tube. When the proper amount of heat is transferred to tube 22, the bend die form roll 40 is actuated to roll backward along the heater plate 90, rotating as it goes in a clockwise direction (as viewed in the example of FIGS. 14–16; in a mirror-image set-up, such rotation would, of course, be counterclockwise). This is indicated in the transition from FIG. 14 to 15 by the rotation arrow 92 and the linear translation arrow 94 associated with axis 42. The motion of form roll 40 relative to the under surface of tube 22 is essentially a pure rolling motion so that little or no relative movement occurs between the tube and the forming surface 44 of roll 40, i.e., linear wrap-tracking mode. This form roll rolling rotation during roll travel thus wraps tube 22 around the die to the extent needed to impart the desired angular extent of bend curvature. However, because the die is moving with a rolling motion along the underside of tube 22, the tube does not move axially from its initial stationary fixtured position, nor does it move axially relative to heating plate 90.

As indicated in FIG. 15, the step of adding heat as referenced in FIG. 4 of the first embodiment process can optionally be employed to further enhance the bending process. Likewise, as indicated in FIG. 16, the previous additional step of heat removal after bending, as by external impingement of cool air stream 82 (as in the steps set forth in FIGS. 5, 9 and 13 of the prior first, second and third embodiment processes) can be optionally performed in the fourth embodiment process to again improve the cycle time of this process.

From the foregoing description it now will be readily understood by those of ordinary skill in the art that the process and apparatus of the invention amply fulfill the aforestated objects and provide many advantages and features over the prior art. The particular values to be employed in the process parameters as outlined hereinbefore thus can be ascertained empirically without undue experimentation, as well as by theoretical analysis, either separately or combined, pursuant to conventional engineering practices in view of the foregoing disclosure of the principles and features of the process and apparatus of the invention. In this regard, it is to be understood that all four bending process and apparatus embodiments disclosed herein normally will have tube 22 pressurized, in the case of thermoplastic tubular material of the aforementioned thin wall category, with compressed air at a working pressure of anywhere from 1 psi to 150 psi, depending largely on the size (angular extent) of the bend and the nature of the tube. Also, various modes of transfer of localized heat energy can be externally applied, such as from conventional heating and/or cooling sources typically used for heating and/or cooling of thermoplastic materials other than by use of hot and cold air streams.

With regard the temperature of the material as it is being heated before, during and even immediately after being bent, it is to be understood that the thermoplastic material is preferably raised to a temperature close to but just below the lower limit of the glass transition temperature range of the material. However, the lower limit of the heating temperature range should be preferably not too far below the glass transition temperature range so that the material in the outer radius portion 20 during the bending process is unable to exert tensile stress to any significant degree on the remaining material of the tube. Therefore there is little or no tensile stress developed in the tube bend that can resolve into a compressive stress in the inner radius portion 28 of the bend 24 as it is being formed.

It is also considered to be within the scope of the invention to employ, as an additional augment to the heating step and/or cooling steps described previously, the application of heat to the fluid 32 (FIG. 2) used for reinforced pressurizing of the tubular member during bending. For example, if tube 22 is charged with heated fluid prior to the initiation of the bending step of FIGS. 4, 8, 12 and 15 of the various embodiments, then the amount of heat energy to be applied by the external heating medium to the backside of the bend area can be correspondingly reduced in order to reach the appropriate bending temperature in outer radius zone 20. Additionally, and optionally, at the completion of the bending cycle in FIGS. 5, 9, 13 and 16, the reinforcing fluid 32 can be replaced by a flow-through charge of cold fluid through the use of suitable valving and controls to thereby speed up the cool down time and hence further reduce cycle time and improve process efficiency. Fluid 32 can be either a suitable liquid or gas, depending upon the material of tube 22 and/or the particular processing equipment and facilities available for practicing the invention.

In one working example of the invention as practiced in the second embodiment of FIGS. 6–9 the following parameters were observed to successfully obtain a 90° bend 24:

IR of tube bend 24 . . . 50 mm to 100 mm

I.D. of tube 22 . . . 25.4 mm
Wall thickness of tube 22 . . . 1.5 mm
Pressurizing fluid 32 . . . Compressed air
Working pressure of fluid 32 . . . Approximately 75 psi
Temperature of heater guide plate 74 . . . 240° C.
Heating time of tube in plate 74 . . . 45 seconds
Material of tube 22 . . . "Polymer-X ESD"™
four layer laminate tubing containing concentric layers of NYLON 12, TBT and PBT made and sold by EMS - CHEME.

What is claimed is:

1. Process for bending a thermoplastic tube to impart a permanent bend curvature to a portion of the tube comprising the steps of:
   (1) providing a rotatable bending die having a bending working surface of revolution contoured in a bending plane with a curvature complemental to the desired final inside radius curvature of the tube in the plane of the desired tube bend,
   (2) providing a forming length of a thermoplastic tube positioned relative to said die such that the tube portion to be bent is juxtaposed to said die working surface,
   (3) forcing one side of said tube portion to be bent into continuous incremental wrap contacting conformity with said die working surface by exerting bending stress incrementally on said forming length of tube with said die resisting such stress by acting as a bending fulcrum while rotating during such tube bending, and
   (4) heating a backside portion of said tube portion diametrically opposite said tube portion one side along a sufficient axial length and to a sufficient processing temperature such as to sufficiently weaken the tensile strength thereof to thereby enable stretching of the outside radius curvature of the tube in step (3) while lowering the tensile reaction stress exerted by bending said backside portion such that any corresponding resultant compressive stress developed in said tube portion one side is insufficient to cause unwanted deformation of the tube wall along the inside radius curvature portion of the resultant tube bend as so formed.

2. The process of claim 1 wherein said heating step (4) is performed during the time period in the process cycle selected from the group of time periods consisting of:
   (a) prior to step (3),
   (b) during step (3),
   (c) after step (3), and
   (d) any combination of (a), (b) and/or (c).

3. The process of claim 1 wherein said step (2) comprises selecting a tube having a starting wall thickness sufficiently large such that the thinning thereof by said stretching occurring in step (4) does not result in a final wall thickness in said tube bend backside portion that is too thin to provide sufficient hoop burst strength to operably contain an internal fluid at working pressures to be exerted within said tube in its intended end-use application.

4. The process of claim 3 wherein said tube wall thickness selecting step includes calculating a given desired amount of maximum stretch of said tube bend backside portion to be imparted in steps (3) and (4) and wherein said temperature of said tube imparted in step (4) and reached during bending in step (3) is only sufficient to allow said calculated given amount of stretch.

5. The process of claim 1 wherein said forming length of tube is internally reinforced during step (3) to thereby substantially prevent inward radial deformation of the wall of said tube in said tube bend as so formed.

6. The process of claim 5 wherein said tube is so internally reinforced by confining a pressure fluid within said tube at least in the portion thereof to be formed into said bend and at a predetermined fluid pressure sufficient to exert radially outwardly directed forces on the interior of said tube wall of a magnitude adequate to prevent radially inward permanent deformation of said backside portion of said bend as so formed.

7. The process of claim 6 wherein said pressure fluid also functions as a tube heating medium by being tube-confined at a starting temperature sufficient to at least assist in raising said backside portion of said tube from ambient to said processing temperature.

8. The process of claim 6 wherein said pressure fluid is cycled after steps (3) and (4) to reduce its temperature as confined in said tube to below said processing temperature to thereby assist in cooling said tube toward ambient temperature.

9. The process of claim 1 including the further step of,
   (5) cooling the backside portion of said tube immediately after the tube bend is formed and heated in steps (3) and (4).

10. The process of claim 9 wherein said heating of steps (4) and said cooling of step (5) are respectively performed by at least directing heating and cooling air currents onto the exterior of said bend backside portion of the tube.

11. The process of claim 9 wherein said cooling step (5) is performed by at least directing a cooling fluid through the bend portion of the tube immediately after completion of steps (3) and (4).

12. The process of claim 10 wherein said heating of step (4) and said cooling of step (5) are also respectively performed by at least flowing heating and cooling fluids through the interior of said tube bend portion.

13. The process of claim 1 wherein step (1) comprises providing a bending die form roll having a contoured surface of revolution operable as said die working surface and being supported to act as a bending fulcrum while rotating about its roll axis with said roll rotational axis oriented perpendicular to the tube longitudinal axis and to the plane of the tube bend being so formed.

14. The process of claim 13 wherein step (2) comprises providing a lock-up grip fixture affixed to said form roll for bodily rotation therewith and operable for grip fixturing a leading end of said tube forming length in said lock-up grip fixture with the immediately trailing portion of said tube forming length oriented tangentially with said bend die form roll working surface.

15. The process of claim 14 wherein step (3) is performed by rotating said bending die form roll about its axis after completing step (2) while restraining the tube trailing portion in a manner to cause wrap roll mutual contact of the forming length of the tubing onto said working surface without inducing any substantial relative motion between the inside radius curvature portion of the tube bend being formed and said form roll working surface as said inside radius tube portion is wrap contacting said working surface.

16. The process of claim 15 wherein said roll rotational axis is supported against translation motion while revolving so that said tube trailing portion is drawn by bodily movement thereof in the direction of the longitudinal axis of the trailing portion onto said form roll working surface.

17. The process of claim 15 wherein step (2) is further performed by providing a guide fixture for receiving the tube trailing portion to establish said initial tube-to-form roll orientation, said guide fixture being stationarily supported for restraining said tube trailing portion during step (3).

18. The process of claim 17 wherein said guide fixture is provided with heating means for imparting heat to the side of said tube trailing portion that is to become the backside portion of said tube bend as so formed to thereby at least assist in performing step (4).

19. The process of claim 17 wherein said guide fixture is open on the side of the tube trailing portion closest to said bend die form roll, and wherein step (3) is performed by conjointly rotating said form roll and rolling said form roll working surface retrogressively along said one side of the trailing portion of the tube while the tube remains axially stationary.

20. The process of claim 19 wherein said guide fixture is provided with heating means for imparting heat to the side of said tube trailing portion that is to become the backside portion of said tube bend as so formed to thereby at least assist in performing step (4).

21. The process of claim 18 wherein said roll rotational axis is supported against translation motion while revolving so that said tube trailing portion is drawn by bodily movement thereof in the direction of the longitudinal axis of the trailing portion onto said form roll working surface.

22. Apparatus for bending a thermoplastic tube to impart a permanent bend curvature to a portion of the tube including in combination:
   (1) a bending die having a rotatable bending working surface of revolution contoured in a bending plane with a curvature complemental to the desired final inside radius curvature of the tube in the plane of the desired tube bend,
   (2) tube positioning means for positioning a forming length of the tube relative to said die means such that the tube portion to be bent is juxtaposed to said die working surface,
   (3) means for forcing one side of the tube portion to be bent into continuous incremental wrap contacting conformity with said die working surface by exerting bending stress incrementally on said forming length of tube with said die resisting such stress by acting as a bending fulcrum while rotating during such tube bending, and
   (4) means for heating a backside portion of said tube portion diametrically opposite the tube portion one side along a sufficient axial length and to a sufficient processing temperature such as to sufficiently weaken the tensile strength thereof to thereby enable stretching of the outside radius curvature of the tube while such bending stress is being exerted while lowering the tensile reaction stress exerted by bending the backside portion such that any corresponding resultant compressive stress developed in said tube portion one side is insufficient to cause unwanted deformation of the tube wall along the inside radius curvature portion of the resultant tube bend as so formed.

23. The apparatus of claim 22 wherein said heating means is operable during the time period in the operation cycle selected from the group of time periods consisting of:
   (a) prior to bending,
   (b) during bending,
   (c) after bending, and
   (d) prior to, during and after bending.

24. The apparatus claim 22 constructed and arranged to be operable on a tube having a starting wall thickness sufficiently large such that the thinning thereof by stretching occurring during bending does not result in a final wall thickness in said tube bend backside portion that is too thin to provide sufficient hoop burst strength to operably contain an internal fluid at working pressures to be exerted within said tube in its intended end-use application.

25. The apparatus of claim 24 wherein the tube wall thickness is selected by calculating a given desired amount of maximum stretch of the tube bend backside portion to be imparted by bending at the processing temperature, and wherein said heating means is operable to impart a processing temperature to said tube during bending only sufficiently high to allow said calculated given amount of stretch.

26. The apparatus of claim 22 including reinforcing means operable such that the forming length of tube is internally reinforced during bending to thereby substantially prevent inward radial deformation of the wall of said tube in said tube bend as so formed.

27. The apparatus of claim 26 wherein said reinforcing means is operable by confining a pressure fluid within said tube at least in the portion thereof to be formed into said bend and at a predetermined fluid pressure sufficient to exert radially outwardly directed forces on the interior of said tube wall of a magnitude adequate to prevent radially inward permanent deformation of said backside portion of said bend as so formed.

28. The apparatus of claim 27 wherein said reinforcing means is operable such that the pressure fluid also functions as a tube heating medium by being tube-confined at a starting temperature sufficient to at least assist in raising said backside portion of said tube from ambient to said processing temperature.

29. The apparatus of claim 27 wherein the reinforcing means is operable such that pressure fluid is cycled after bending to reduce its temperature as confined in said tube to below the processing temperature to thereby assist in cooling the tube toward ambient temperature.

30. The apparatus of claim 22 further including means for cooling the backside portion of said tube immediately after the tube bend is heated and.

31. The apparatus of claim 30 wherein said heating means and said cooling means are respectively operable to at least direct heating and cooling air currents onto the exterior of said bend backside portion of the tube.

32. The apparatus of claim 30 wherein said cooling means is operable to at least direct a cooling fluid through the bend portion of the tube immediately after completion of bending.

33. The apparatus of claim 31 wherein said heating means and said cooling means are also respectively operable to at least flow heating and cooling fluids through the interior of said tube bend portion.

34. The apparatus of claim 22 wherein said bending die comprises a form roll having a contoured surface of revolution operable as said die working surface and being supported to act as a bending fulcrum while rotating about its roll axis with said roll rotational axis oriented perpendicular to the tube longitudinal axis and to the plane of the tube bend being so formed.

35. The apparatus of claim 34 wherein said forcing means comprises a lock-up grip fixture affixed to said form roll for bodily rotation therewith and operable for grip fixturing a leading end of said tube forming length in said lock-up grip fixture with the immediately trailing portion of said tube forming length oriented tangentially with said bend die form roll working surface.

36. The apparatus of claim 35 wherein said forcing means is operable by rotating said bending die form roll about its axis after completing the grip fixturing while restraining the tube trailing portion in a manner to cause wrap roll mutual contact of the forming length of the tubing onto said working surface without inducing any substantial relative motion between the inside radius curvature portion of the tube bend being formed and said form roll working surface as said inside radius tube portion is wrap contacting said working surface.

37. The apparatus of claim 36 constructed and arranged such that the roll rotational axis is supported against translation motion while revolving so that the tube trailing portion is drawn by bodily movement thereof in the direction of the longitudinal axis of the trailing portion onto said form roll working surface.

38. The apparatus of claim 36 wherein said forcing and positioning means comprises a guide fixture for receiving the tube trailing portion to establish said initial tube-to-form roll orientation, said guide fixture being stationarily supported for restraining said tube trailing portion during bending.

39. The apparatus of claim 38 wherein said guide fixture includes heating means for imparting heat to the side of said tube trailing portion that is to become the backside portion of said tube bend as so formed to thereby at least assist in heating the same to the processing temperature.

40. The apparatus of claim 38 wherein said guide fixture is open on the side of the tube trailing portion closest to said bend die form roll, and wherein said apparatus is constructed and arranged for conjointly rotating said form roll and rolling said form roll working surface retrogressively along said one side of the trailing portion of the tube while the tube remains axially stationary.

41. The apparatus of claim 40 wherein said guide fixture is provided with heating means for imparting heat to the side of said tube trailing portion that is to become the backside portion of said tube bend as so formed to thereby at least assist in heating the same to the processing temperature.

42. The apparatus of claim 39 constructed and arranged such that said roll rotational axis is supported against translation motion while revolving so that said tube trailing portion is drawn by bodily movement thereof in the direction of the longitudinal axis of the trailing portion onto said form roll working surface.

* * * * *